US010185742B2

(12) United States Patent
Geissinger et al.

(10) Patent No.: US 10,185,742 B2
(45) Date of Patent: Jan. 22, 2019

(54) FLEXIBLE TEXT SEARCHING FOR DATA OBJECTS OF OBJECT NOTATION

(71) Applicant: SAP SE, Walldorf (DE)

(72) Inventors: Steffen Geissinger, Wiesloch (DE); Frederik Transier, Heidelberg (DE)

(73) Assignee: SAP SE, Walldorf (DE)

( * ) Notice: Subject to any disclaimer, the term of this patent is extended or adjusted under 35 U.S.C. 154(b) by 458 days.

(21) Appl. No.: 14/971,883

(22) Filed: Dec. 16, 2015

(65) Prior Publication Data

US 2017/0177672 A1   Jun. 22, 2017

(51) Int. Cl.
*G06F 17/00* (2006.01)
*G06F 17/30* (2006.01)

(52) U.S. Cl.
CPC .. *G06F 17/30424* (2013.01); *G06F 17/30418* (2013.01)

(58) Field of Classification Search
CPC ... G06F 8/315; G06F 8/24; G06F 8/73; G06F 17/30607; G06F 17/30; G06F 21/6227
See application file for complete search history.

(56) References Cited

U.S. PATENT DOCUMENTS

| 8,161,024 | B2 | 4/2012 | Renkes et al. |
| 8,321,429 | B2 | 11/2012 | Kirk et al. |
| 2009/0319518 | A1* | 12/2009 | Koudas ............. G06F 17/30696 |
| 2015/0142819 | A1 | 5/2015 | Florendo et al. |
| 2016/0055220 | A1 | 2/2016 | Joshi et al. |
| 2017/0177604 | A1 | 6/2017 | Geissinger et al. |

OTHER PUBLICATIONS

"Inverted Index," *Wikipedia*, visited Dec. 2, 2015, 3 pages.
Zobel et al., "Inverted Files Versus Signature Files for Text Indexing," *ACM Transactions on Database Systems*, vol. 23, No. 4, doi:10.1145/296854.277632, Dec. 1998, pp. 45.-490, 38 pages.
"Sphinx 2.2.10-release reference manual," http://sphinxsearch.com/docs/current.html, visited Dec. 2, 2015, 209 pages.
"pJSON (persistent json)—Vesper," OneCommons, onecommons.org, archived Jun. 2013, 7 pages.
Veloso, "JSON to Persistent Data Store (CoreData, etc.)," stackoverflow.com, Apr. 1, 2010, 2 pages.
"JSPON: JavaScript Persistent Object Notation," jspon.org, visited Sep. 4, 2015, 2 pages.
Savia, "CJSON—Compressed JSON," codeproject.com, Feb. 5, 2014, 6 pages.
"Convert Bson to string—MongoDB/Javascript," stackoverflow website, Dec. 9, 2012, 1 page.

(Continued)

*Primary Examiner* — Truong V Vo
(74) *Attorney, Agent, or Firm* — Klarquist Sparkman, LLP (57) ABSTRACT

Flexible text searching for data objects can be implemented. For example, inexact matching of key name terms can be supported. An inverted index can be used to find data objects having key names with terms that are a superset of the key name term being searched. A similar index can be used for values, and the search results can be determined via an intersection. Pattern searching and other features can be supported. Text searching for schema-less collections of data objects can be supported for use in enterprise computing scenarios.

20 Claims, 8 Drawing Sheets

(56) References Cited

OTHER PUBLICATIONS

Specification Version 1.0, BSON Specification, bsonspec.org website, visited Nov. 4, 2015, 4 pages.
"BSON," *Wikipedia* website, visited Nov. 4, 2015, 3 pages.
"Smile (data interchange format)," *Wikipedia* website, visited Nov. 4, 2015, 2 pages.
"SmileFormatSpec," fasterxml website, visited Nov. 4, 2015, 12 pages.
"Document-oriented database," *Wikipedia* website, visited Nov. 4, 2015, 10 pages.
"Introducing JSON," json.org website, visited Nov. 4, 2015, 4 pages.
"Standard ECMA-404: The JSON Data Interchange Format," ECMA International, Oct. 2013, 14 pages.
"Technical Overview," CouchDB website, visited Nov. 20, 2015, 8 pages.
"Dictionary coder," *Wikipedia* website, visited Nov. 20, 2015, 3 pages.
"Semi-structured data," *Wikipedia* website, visited Nov. 23, 2015, 3 pages.
"ObjectID," MongoDB Manual 3.0, MongoDB website, visited Nov. 24, 2015, 3 pages.
James Morle's Blog, "Oracle's In-Memory Database: The True Cost of Licensing," Jul. 25, 2014, 9 pages.
"Persistence (computer science)," Wikipedia, visited Dec. 2, 2015, 4 pages.
"Self-documenting," Wikipedia, visited Dec. 3, 2015, 2 pages.

* cited by examiner

FLEXIBLE TEXT SEARCHING FOR DATA OBJECTS OF OBJECT NOTATION

BACKGROUND

Data objects are common in various data processing scenarios. For example, data objects are commonly used to communicate information between a web browser and the backend server. In such scenarios, object notation such as JavaScript Object Notation (JSON) has become a widespread and accepted format for sending and receiving data objects.

Over time, rather large collections of data objects can be accumulated. There are technologies for searching such collections using traditional techniques, but limitations arise in real-world enterprise computing scenarios.

There is therefore room for improvement.

SUMMARY

The Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

In one embodiment, a method of receiving a search query comprises a target key name term and a target value; running the search query against a collection of data objects, wherein running the search query comprises finding data objects in the collection that have a key name that inexactly matches the target key name term and also have a value for the key name that matches the target value; and outputting results of the search query, wherein the results comprise an indication of the found data objects.

In another embodiment, a system comprises one or more processors; memory; in one or more computer-readable storage media, a key name term inverted index that associates key name terms and data objects in a data object collection in which the key name terms appear; in one or more computer-readable storage media, a value term inverted index that associates value terms and data objects in the data object collection in which the value terms appear; and a query engine supporting search queries on the data objects, wherein the query engine inexactly matches a target key name term and a target value to data objects via the key name term inverted index and the value term inverted index.

In another embodiment, one or more computer-readable media comprise computer-executable instructions causing a computing system to perform a method comprising receiving a search query comprising a target key name term and a target value; finding an occurrence of the target key name term in a key name term dictionary, wherein the key name term dictionary associates the target key name term with an index reference into a key name term inverted index; in an index entry of the key name term inverted index referenced by the index reference, determining a first set of candidate key-object pairs, wherein at least one of the candidate key-object pairs indicates at least one key name term other than the target key name term, whereby inexact matching is supported; for the target value, determining a second set of candidate key-object pairs; determining an intersection of the first set of candidate key-object pairs and the second set of candidate key-object pairs, wherein the determining comprises comparing key name identifiers that are scalar values; and outputting the intersection of the first set of candidate key-object pairs and the second set of candidate key-object pairs as a result for the search query.

As described herein, a variety of other features and advantages can be incorporated into the technologies as desired.

DETAILED DESCRIPTION

Example 1—Example Overview

Flexible text searching can be performed on collections of data objects as described herein. Inexact matching for key names can be supported to provide greater text search flexibility. Other features relating to intersection and inverted indexes can be employed to achieve the technologies as described herein.

Flexible text searching can be used by software developers or data analysts in real-world enterprise computing scenarios to advantage. For example, schema-less collections of data objects may have a hodgepodge of key names that present a searching challenge. Such data objects can originate from different sources, different versions of a same source, or the like. The inexact matching technologies described herein can find additional data objects beyond conventional text searching techniques for data objects. Data that is of interest could otherwise be overlooked.

Further, multiple key-name-specific searches can be avoided by enabling more generic key name searches, reducing the number of total searches that need to be performed and/or maintained.

Therefore, overall performance of a text searching system can be enhanced as described herein.

Example 2—Example System Implementing Flexible Searching of Data Objects

Figure 1:
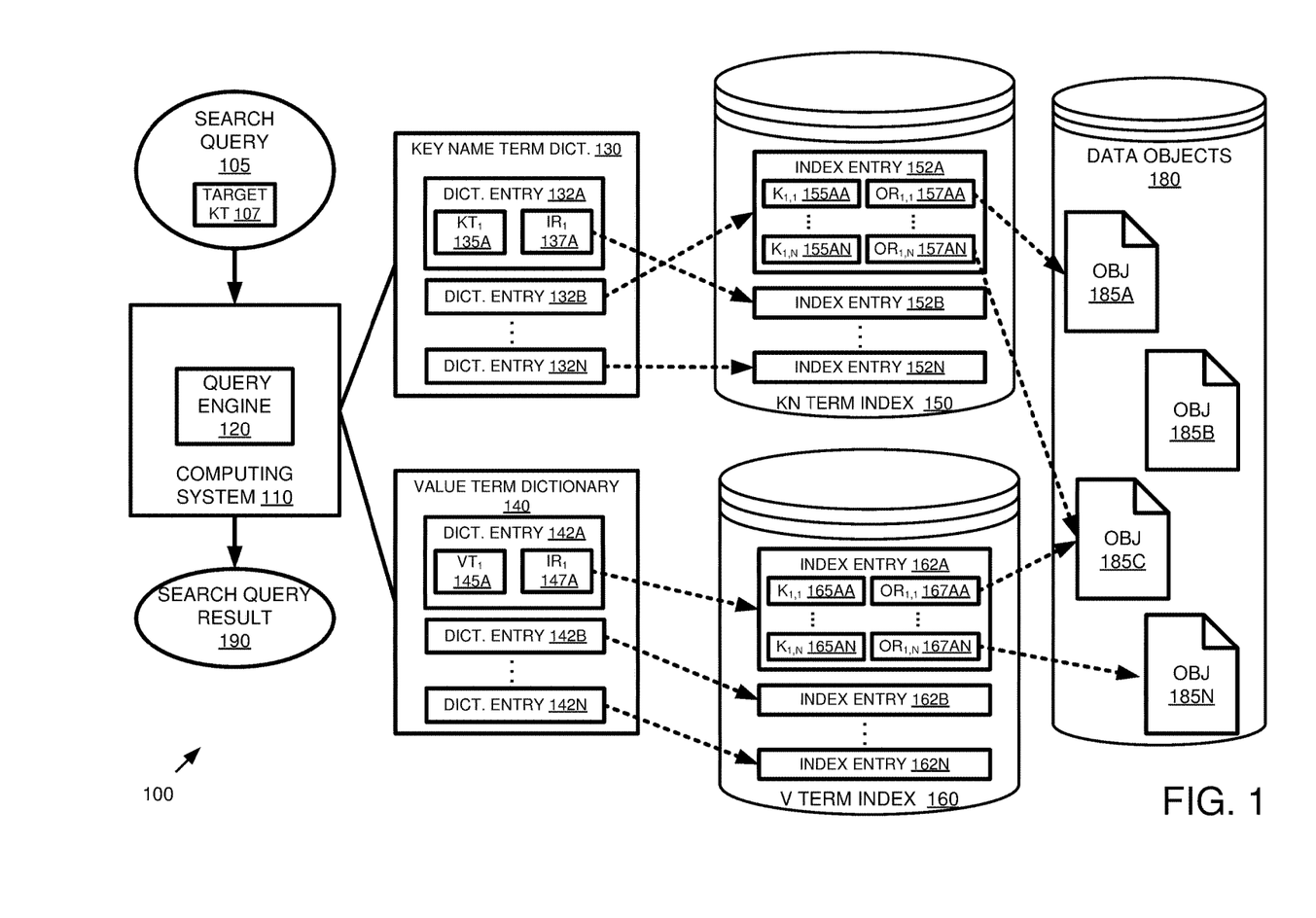
FIG. 1 is a block diagram of an example system for implementing flexible text searching for data objects.

FIG. 1 is a block diagram of an example system 100 implementing flexible text searching for data objects.

In the example, a computing system 110 comprising a query engine 120 receives a search query 105 comprising a target key name term 107. The query engine 120 is configured to search the collection 180 of data objects 185A-N and return a search query result 190 that indicates those data objects (e.g., 185C or the like) out of the collection 180 that match the search query 105 as described herein.

Inexact key name matching can be supported with the key name term dictionary 130 and the key name term inverted index 150, which ultimately refer to occurrences within fields of individual objects 185A-N in the collection 180.

As described herein, the key name term dictionary 130 in combination with the key name term inverted index 150 can be used to find those objects that have key names that contain a given key name term.

For the value portion of the search query, a value index can be used. In the example, a value term dictionary 140 is used in combination with a value term inverted index 160. However, any value index that matches for the value portion of the search query can be used. Inexact matching for the value portion of the search query can be but need not be supported.

The query engine 120 supports search queries on the data objects 185A-N and can inexactly match a target key name term and a target value to data objects via the key name term inverted index 150 and the value term inverted index 160.

Although a particular arrangement of the dictionaries 130, 140 and inverted indexes 150, 160 is shown, in practice, the arrangement can be varied. For example, some portions of the dictionaries and/or indexes can be omitted, expanded, combined, separated, or the like.

In any of the examples herein, although some of the subsystems are shown in a single box, in practice, they can be implemented as computing systems having more than one device. Boundaries between the components can be varied. For example, although the computing system 110 is shown as a single entity, it can be implemented by a plurality of devices.

In practice, the systems shown herein, such as system 100, can vary in complexity, with additional functionality, more complex components, and the like. For example, there can be multiple, different dictionaries and/or indexes shared by respective collections of encoded data objects (e.g., per-collection dictionaries). Additional computing systems can access the collection 180 in an enterprise computing scenario. As described herein, the collection 180 can be used to implement document containers for data objects in web service environments. Additional components can be included to implement security, redundancy, load balancing, report design, and the like.

In practice, a large number of different computing systems 110 (e.g., executing at plural instances of a client system, in the cloud, or the like) can be supported. The data objects 185A-N in the collection 180 can be searched efficiently using inexact matching by such computing systems 110 because the dictionaries and indexes can reduce the amount of computing resources expended to find search query results.

The described computing systems can be networked via wired or wireless network connections. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, the inputs, outputs, data objects, dictionaries, indexes, and environments can be stored in one or more computer-readable storage media or computer-readable storage devices. The technologies described herein can be generic to the specifics of operating systems or hardware and can be applied in any variety of environments to take advantage of the described features.

Example 3—Example Data Structures for Key Name Portion of Query

In any of the examples herein, one or more data structures, indexes, dictionaries, or the like can be incorporated into the technologies to assist with searching the key name portion of the query. For example, inexact matching for key name terms can be implemented.

As shown in FIG. 1, a key name term dictionary 130 can store dictionary entries 132A-N. A given dictionary entry 132A comprises a key term 135A and an index reference entry (e.g., 137A pointing to 152B) of the key name term inverted index 150. The key name term dictionary 130 has entries for any key name terms appearing in the data objects of the collection 180 and refers to the key name term inverted index 150. There are a plurality of dictionary entries 132A-N for respective key name terms appearing in the data objects 185A-185N (e.g., one entry per key name term). In practice, the key name terms (e.g., 135A) can be implied instead of explicitly stored in the dictionary.

As shown, the key name term dictionary 130 can include term dictionary entries 132A-N, where a term dictionary entry associates a given key name term (e.g., key name term 135A) to a respective index reference (e.g., index reference 137A) that points to an index entry of the key name term inverted index that has key names containing the key name term (e.g., 135A) of the key name term dictionary entry (e.g., 132A). In the example, a dictionary entry points to only one index entry (e.g., which has the matches for the key name term). One query term can match more than one dictionary entry (e.g., in the inexact scenario).

Various alternatives are possible. For example, the dictionary and index can be combined. A number of different dictionary types can be implemented in combination with a single index. For example, different dictionaries can support different operations (e.g., pattern search, fuzzy search, regular expression search, prefix search, suffix search, or the like).

In practice, the key name term dictionary 130 can be arranged to be optimized for search by key name term. For example, the dictionary can use various tree structures, ordered lists, hashes, partitioned entries, combinations thereof, of the like. Thus, given a particular key name term, the key name term dictionary 130 can quickly return a corresponding index reference to the key name term inverted index 150. In practice, any number of techniques for representing the association between key name term and index reference can be employed.

The key name term inverted index 150 comprises a plurality of index entries 152A-N that are lists of occurrences of the key name term within the data objects 185A-N in the collection 180 (and thus also the dictionary 130). A list can comprise references to particular objects and a given reference can take the form of an object reference-key name pair (e.g., a pair comprising an object reference 157AA and a key name indication 155AA).

Thus, the key name term inverted index 150 has entries for any key name terms appearing in the data objects of the collection 180. The inverted index 150 can associate key name terms (e.g., represented by an entry with a list of pairs for a given key name term, which in turn indicate the key-name-term-containing key names themselves) with data objects in a data object collection in which the key name terms appear.

When an occurrence of a data object is designated by a data object reference-key name pair, the key name pair can be represented by a key name identifier (e.g., scalar number). As described herein, such an identifier can be specific to the object (e.g., indicate the key name by number indicating where in the data object the key name appears), or a global key name identifier can be used. Such an arrangement of representing the key name with a scalar number can facilitate quick functionality to quickly find those objects in the collection 180 that match the search query as compared to string comparisons.

Example 4—Example Data Structures for Value Portion of Query

In any of the examples herein, a value index can be supported. Although any value index that enables quickly searching for values occurring in the data objects 185A-N can be used, an indexing technique similar to that for the key name portion of the query can be used as shown in the example.

Values can be searched with a value term dictionary 140 and value term index 160 as shown. The value term dictionary 140 can comprise dictionary entries 142A-N, where a given dictionary entry 142A relates a value term 145A with an index reference 147A to the value term inverted index 160.

The value term inverted index entries 162A-N can include a list of references to particular objects and a given reference can take the form of an object reference, key name pair (e.g., a pair comprising an object reference 167AA and a key name indication 165AA of the key name in the object having the value). The value term inverted index can associate values and data objects in the data object collection in which the values appear. Instead of value terms as shown, entire values can be used.

Instead of the value term dictionary 140, a simple value dictionary, or no dictionary can be used for values. For example, some implementations may not be directed to inexact searching of values, so a value term dictionary may not be of interest. Similarly, any example showing a value term inverted index and/or value term dictionary can use a value index instead.

Example 5—Example Method of Flexible Text Searching

Figure 2:
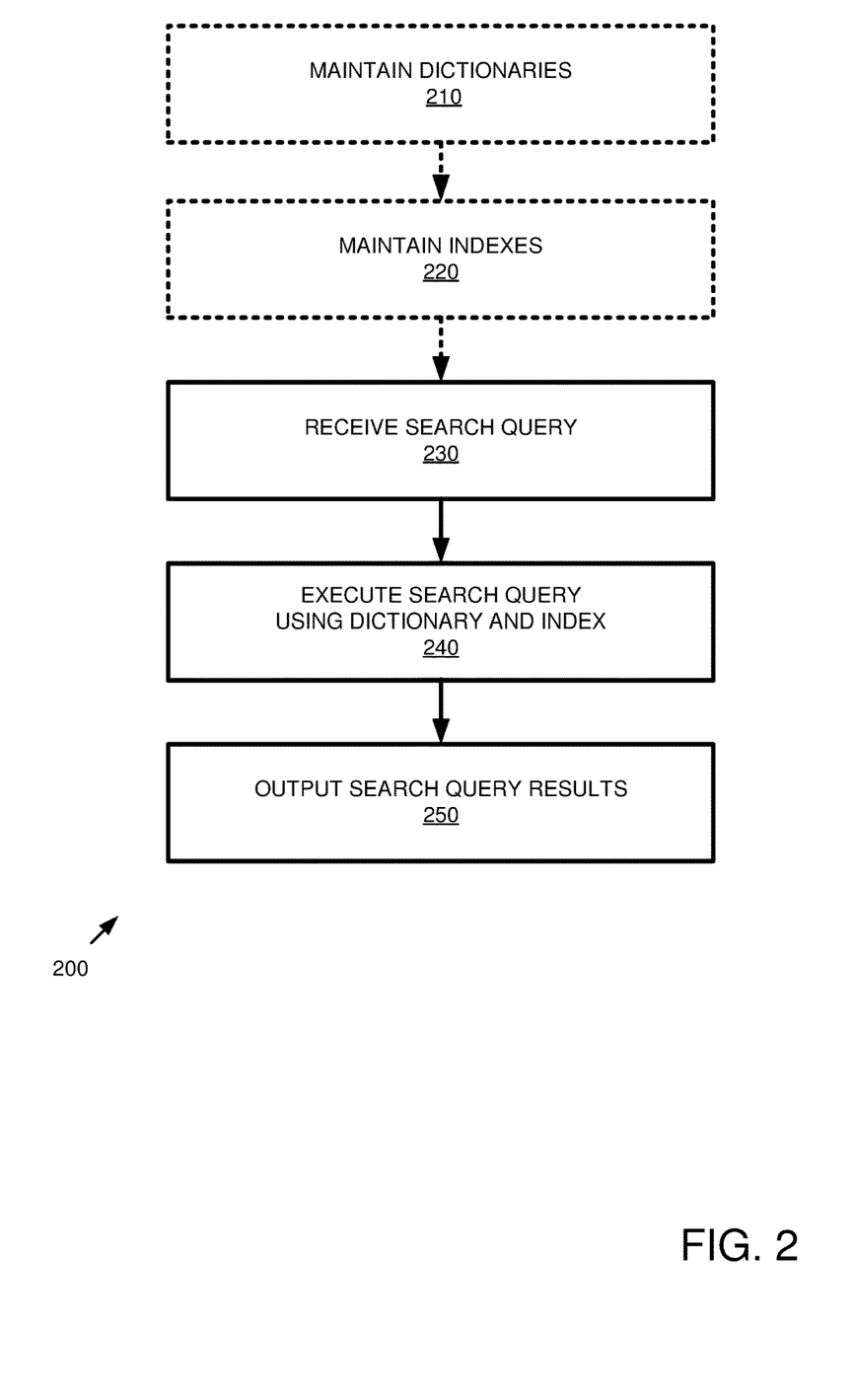
FIG. 2 is a flowchart of an example method implementing flexible text searching for data objects.

FIG. 2 is a flowchart of an example method 200 of implementing flexible text searching for data objects and can be implemented, for example, in the system shown in FIG. 1.

In practice, actions can be taken before receiving a search query to maintain the dictionaries 210. For example, when data objects are added, deleted, or edited, the key name term dictionary can be updated accordingly. Any other dictionaries can also be updated. Similarly, at 220, actions can be taken to maintain any indexes.

At 230, a search query is received. As described herein, such a search query can comprise a target key name term for which matching data objects are sought. The search query can take a variety of forms using a syntax that supports inexact searching as described herein. The search query can incorporate additional key name terms as described herein.

The search query typically also has a value portion. For the value portion, one or more target value terms, a target value, or other value search can be included. Such values are considered to be a match if a matching key name also has a corresponding value that matches the value portion of the search query.

At 240, the search query is run against the collection of data objects using the key name dictionary and key name term inverted index as described herein. Running the query finds data objects in the collection that have a key name that inexactly matches the target key name term and also have a value for the key name that matches the value portion of the search query. Additional dictionaries and/or indexes can be used during search query processing as described herein. Those data objects matching the search query are identified during query processing. Value term matching can be supported as described herein.

Finding data objects that match can comprise finding data objects that are indicated as matching by both the key name term inverted index and a value index as described herein. Intersection techniques can be used to make such a determination.

At 250, the search query results are output. Such output can take a variety of forms. For example, the matching objects, references to the matching objects, the matching key name-value pairs, combinations thereof, or the like can be returned as output. Thus, the results can comprise an indication of the found data objects.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, for 210 "receive search query" can also be described as "send search query."

Example 6—Example Other Method of Text Searching Via Intersection

Figure 3:
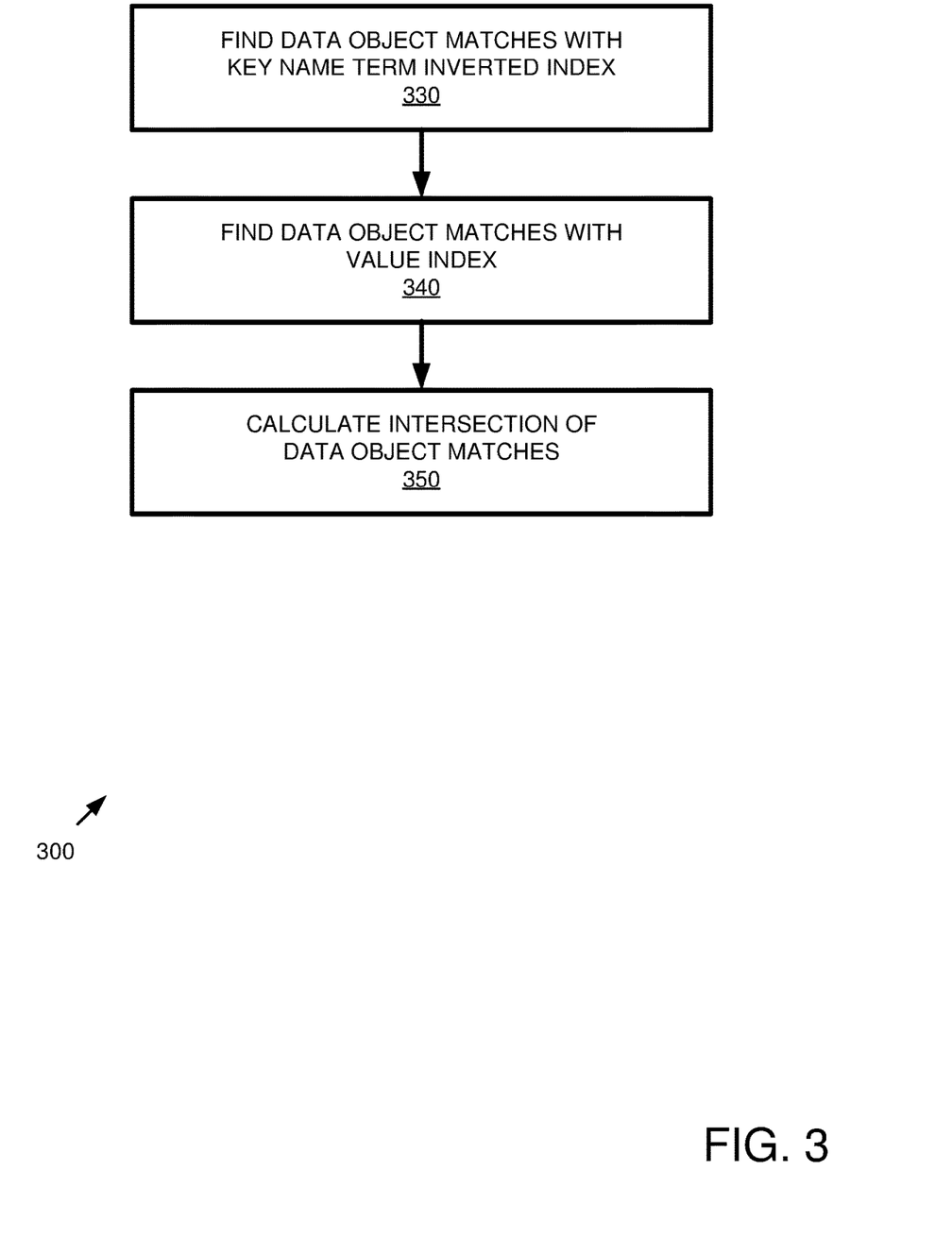
FIG. 3 is a flowchart of an example method of text searching data objects via an intersection technique.

FIG. 3 is a flowchart of an example method 300 of text searching data objects via an intersection technique and can be implemented in conjunction with the method of FIG. 2. For example, running a search query against a collection of data objects can be implemented via the method 300.

At 330, data object matches are found with the key name term inverted index. For example, the object-field name pairs that match the search query (e.g., objects having key names that contain the target key name term) can be found. Such matches can be treated as a first set of candidate matches.

At 340, data object matches are found with a value index. For example, the object-field name pairs that match the search query (e.g., objects having key names with values that contain the target value from the search query) can be found. Such matches can be treated as a second set of candidate matches. A value term dictionary and value term inverted index can be used as described herein.

At 350, the results are calculated by finding an intersection of the data object matches (e.g., intersection between the first set of candidate data object matches and the second set of candidate data object matches). Intersection can be supported by representing the candidates via a key name (e.g., field) identifier so that an intersection can be computed more quickly than using strings.

In some implementations, the initial results may contain false positives. For example, a provisional match can be indicated by a dictionary and/or index, but the actual key name or value does not match the search query. Accordingly, such false positives can be filtered out before providing the results.

Example 7—Example Data Object

In any of the examples herein, a data object can take the form of one or more key name-value pairs. In practice, a key name is sometimes called an "attribute," "field," "field name," "key value," "value of a key," or simply "key."

The data objects represented herein (e.g., in a collection) can be of a schema-less nature. In other words, relational database conventions of using uniform key names across objects need not be followed. For example, a key name "home address" may have values in some data objects but not others. Such objects are sometimes called "semi-structured" because there is a structure, but no uniform schema. In fact, there may be multiple schemas in a mixed environment, which essentially leads to a schema-less representation because there is no uniform schema.

Such non-uniformity can be accounted for by supporting flexible searching as described herein. As described herein, inexact matching can be used to find occurrences of key names that contain a target key name term.

Thus the schema-less nature can be exhibited in that a key name present in one data object need not be present in another (e.g., the field is missing from at least one object in a collection of data objects).

Example 8—Example Object Notation

In any of the examples herein, an example object notation (or "data object notation") can represent data objects and thus comprises one or more key name-value pairs. In practice, such data objects comprise a plurality of key name-value pairs that are represented via the notation. In conventional object notation format, such key names are represented in text (e.g., ASCII, Unicode, or the like). However the objects can be encoded or compressed while still taking advantage of the technologies described herein. An example of an object notation format that is in widespread use is JavaScript Object Notation (JSON). Such objects are sometimes called "JSON objects," and can be used in any of the examples herein. However, the technologies described herein can be used on other object notations to advantage.

In any of the examples herein, a lightweight data object notation (e.g., JSON and the like) can be used to represent the data objects. A lightweight data object notation can list key names only one time per key name invocation, rather than using tags at the beginning and end of the invocation, such as is done in XML.

Nestable data objects can be supported.

Example 9—Example Query Engine

In any of the examples herein, a query engine can perform the various methods described herein to effectuate searching. For example, a query engine can perform the methods shown in FIG. 2 or 3. In practice, portions of the methods can be performed instead of the full method (e.g., maintenance can be performed by other parts of the system).

Example 10—Example Key Name Identifiers

In any of the examples herein, a key name identifier can be implemented to represent key names. For example, a positional indication of where in the data object the key name appears can be used (e.g., first key name is 1, second key name is 2, or the like). Or, a hash or dictionary entry can be used. Such an arrangement allows easy calculation of an intersection.

A positional indication can be used to avoid false positives when a data object has multiple identical key names (e.g., two "home addresses" but only one of them has a value that matches the target value).

In practice, such a key name identifier can take the form of a scalar value (e.g., integer or the like) or any other value that is easily compared (e.g., with a single operation). String values are typically avoided due to the computationally-intensive nature of comparing strings.

Example 11—Example Further Details

In any of the examples herein, finding data objects in a collection can comprise finding an entry in a key name term inverted index that contains the target key name term. Via the entry in the key name term inverted index, a matching data object can be found as described herein.

Finding data objects in the collection can comprise finding an entry in a key name term inverted index that contains the target key name term. Such an entry can comprise a plurality of references to a plurality of candidate data objects in the collection. An intersection can be determined between the candidate data objects and data objects that also have a value for the key name that matches the target value.

Such an intersection can be determined by finding an entry in a value term inverted index that matches the target value. Such an entry can comprise a plurality of references to other candidate objects in the collection. Data objects that are referred to as matching by both the key name term inverted index and the value term inverted index can be found (e.g., by matching key name identifiers as described herein). Other searches may use value terms. Thus, "matching" a value can include a full match, term match, pattern match, contains match, or the like. A full match can also be somewhat flexible in that it can be case insensitive, ignore certain characters, and/or treat unlike characters as matching (e.g., a hyphen matches a space, or the like).

The key name term inverted index 150 can include entries that indicate a full key name (e.g., more than just a single term for key names having multiple terms) of the object indexed. As described herein, the full key name can be explicitly indicated, a key name identifier can be stored, or both.

In any of the examples herein, the search query can be a syntax that indicates that a specified string is to be interpreted as a key name term for inexact matching against key names of the data objects as described herein.

Example 12—Example Intersection Scenario

Figure 4:
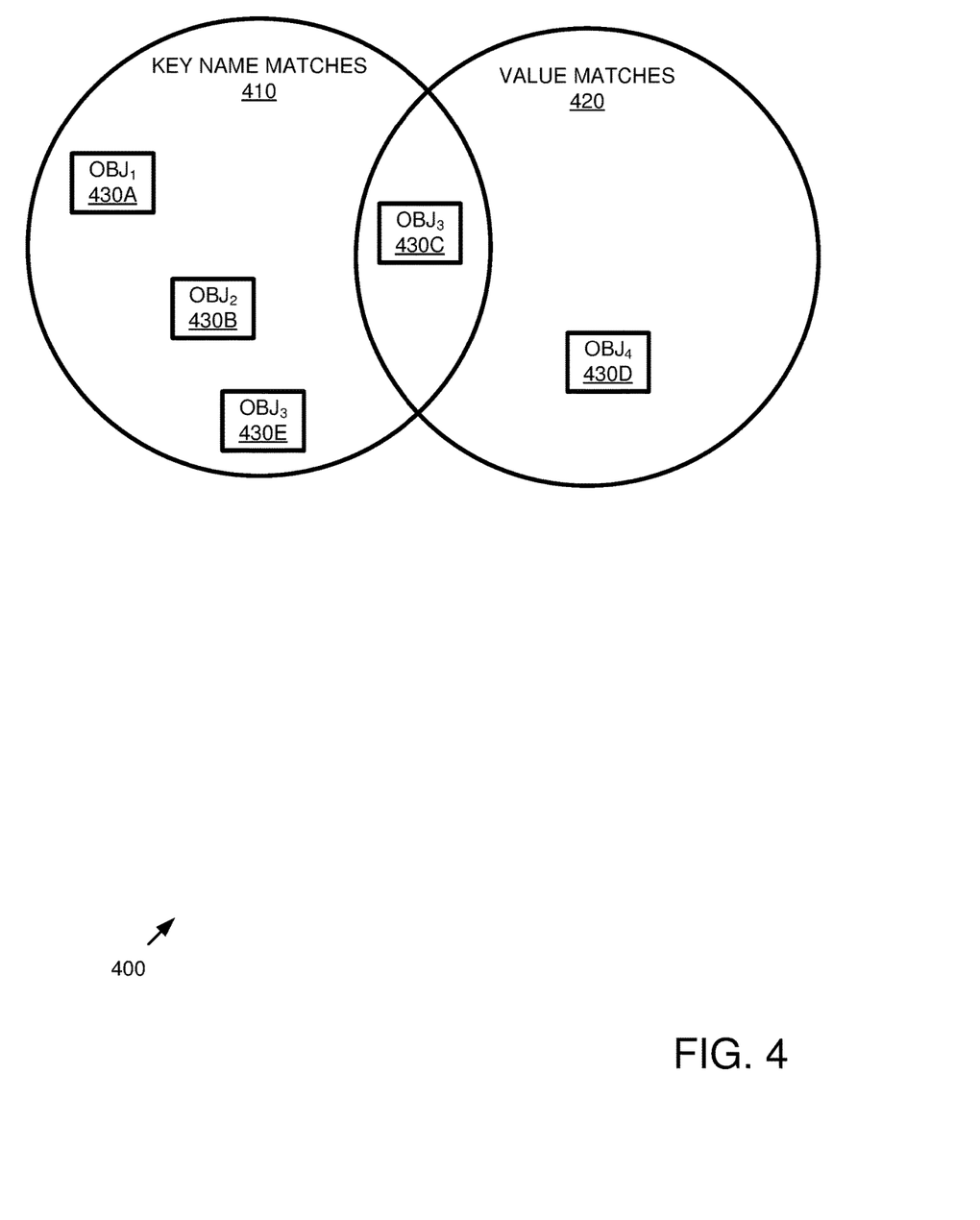
FIG. 4 is a block diagram of an example intersection scenario for text searching of data objects.

In any of the examples herein, an intersection scenario can be applied to text searching data objects. FIG. 4 is a block diagram of an example intersection scenario 400 for text searching of data objects.

In the example, a first set of candidate matching data objects 430A, 430C, 430B, and 430E match a key name portion of the search query. A second set of candidate matching data objects 430C and 430D match a value portion of the search query.

One or more objects 430C are determined to be an intersection between the sets. In one case, an object be considered twice 430E because it has a key name that matches the key name portion of the query, but the particular key name has a value that does not match the value portion of the search query. However, another key name of the same object is indicated as a true match 430C.

As described herein, key name identifiers can be used to find intersection. For example, object reference-key name pairs, where the key name is identified by a key name identifier (e.g., positional or otherwise) can be compared quickly to identify full matches. Thus, matching can be performed at the actual object-key name pair level. In some cases, the actual data objects themselves need not be consulted or read to determine whether there is a match.

Any number of other intersection scenarios are possible. For example, a search query with a plurality of terms can be implemented by finding matches for the individual terms and then determining an intersection.

Example 13—Example Inexact Matching Scenario

Figure 5:
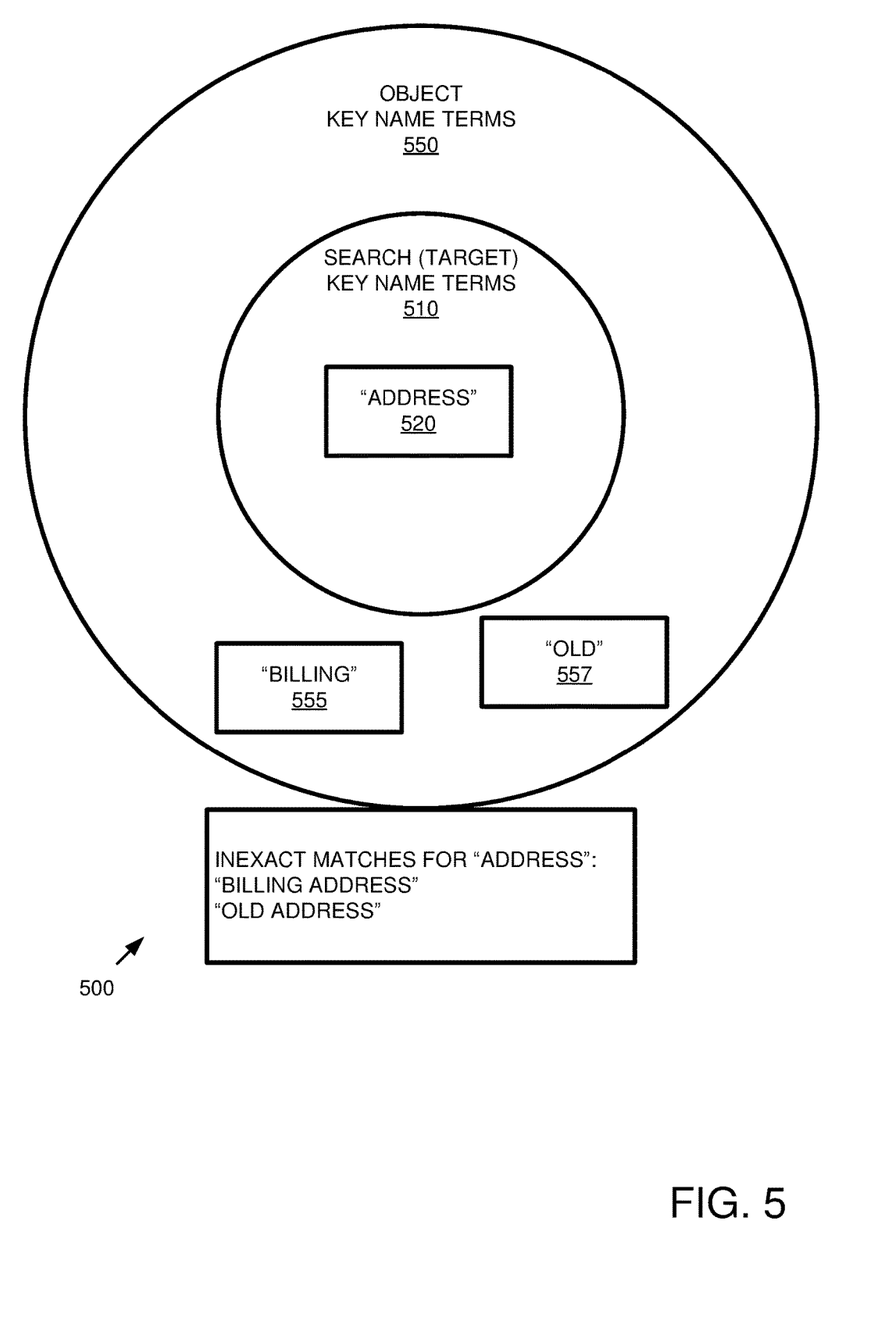
FIG. 5 is a block diagram of an example inexact matching scenario for text searching data objects.

FIG. 5 is a block diagram of an example inexact matching scenario 500 for text searching data objects that can be implemented in any of the text searching examples herein. Inexact matching can be used in any of the examples herein when searching for a match.

In the example, the target key name term 520 is "address." In an inexact match scenario, "billing address" and "old address" are considered to match the term "address." Therefore, the object key name terms can include one or more additional terms 555, 557 (e.g., extra terms, other terms, superset terms, or the like).

Thus, finding data objects in the collection that have a key name that inexactly matches a target key name term can comprise finding data objects in the collection that have key names with terms that are a superset of the target value term.

False positives can arise in such a scenario when a plurality of terms are desired to appear in an exact order, and filtering can be performed accordingly.

Example 14—Example Implementation of Flexible Text Searching

Figure 6:
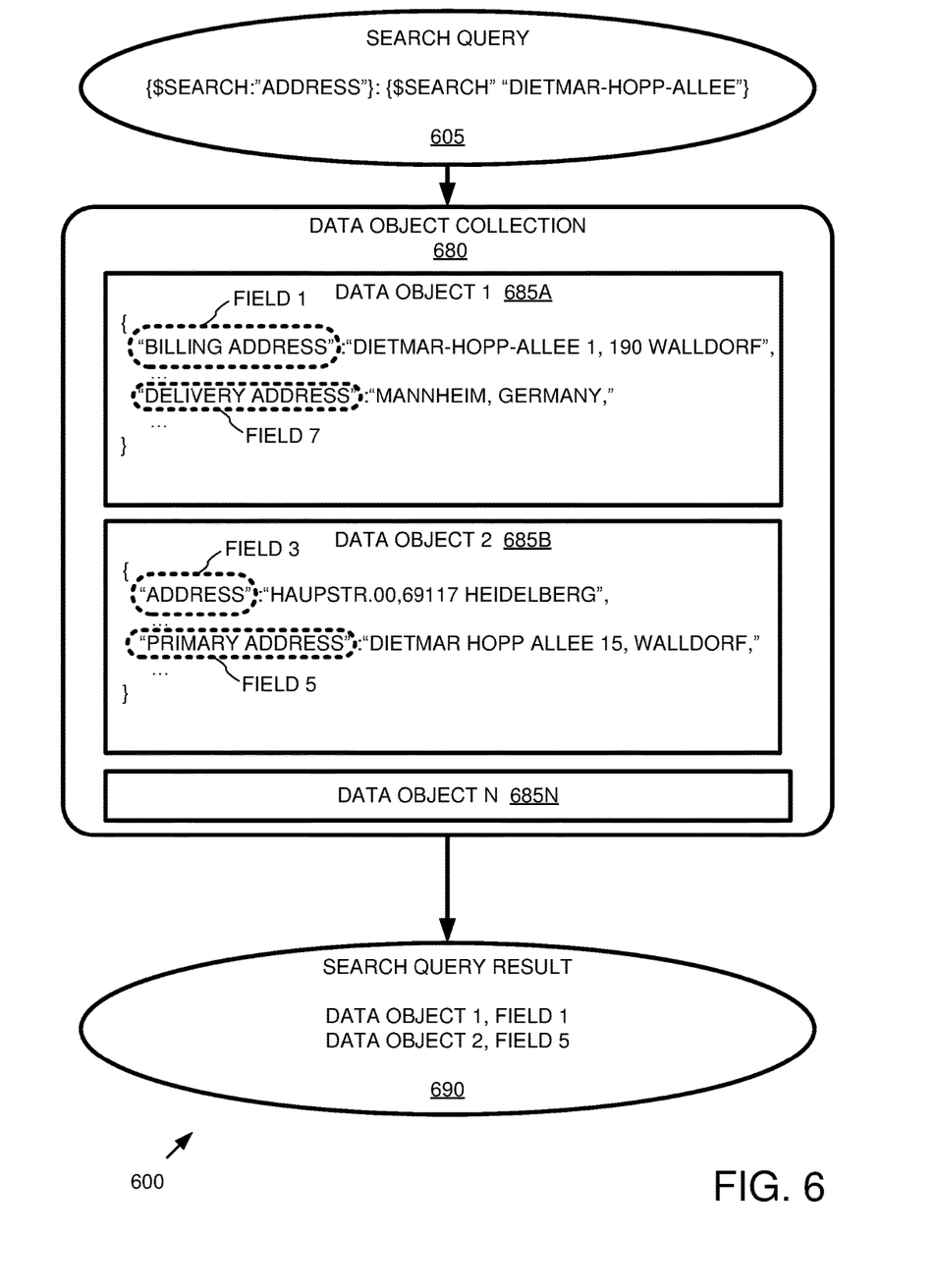
FIG. 6 is a block diagram of an example implementation of flexible text searching of data objects supporting inexact matching of key names.

FIG. 6 is a block diagram of an example implementation 600 of flexible text searching of data objects supporting inexact matching of key names.

In the example, a search query syntax is supported by which a search query 605 can specify a key name term (e.g., "ADDRESS" and a full value "DIETMAR-HOPP-ALLEE"). The syntax is interpreted to mean that the search query specifies that objects having any key name-value pair that contains the key name term "ADDRESS" with the value "DIETMAR-HOPP-ALLEE" matches. However, alternatives are possible (e.g., the value is specified as terms "DIETMAR" and "HOPP" and matches include values "DIETMAR-HOPP," "DIETMAR-HOPP-STRASSE") or the like.

In the example, the search query 605 is run against the data object collection 680 which contains data objects 685A-N. The key names ("fields") are designated positionally (e.g., where they occur in the data object), so that the key name term inverted index indicates a match at field 1 ("BILLING ADDRESS") and field 7 ("DELIVERY ADDRESS") of the data object 1 685A. Similarly, the key name term inverted index indicates a match at field 3 ("ADDRESS") and field 5 ("PRIMARY ADDRESS") of data object 2 685B.

Although there are four candidate key name term matches indicated by the index, an intersection with value matches reveals that only field 1 of data object 1 and field 5 of data object 2 are actual matches, which are returned as the query results 690.

Example 15—Example Pattern Searching

In any of the examples herein, pattern searching can be supported. For example, a wildcard can be specified, and matches are determined to be those matches that match the pattern comprising the wildcard (e.g., "address*" matches "address" as well as "addresses"). Such patterns can be specified as a target term, target full value, or the like.

Thus, if a target key name term specifies a pattern, finding an inexact match can comprise finding data objects in the collection that have key names that match the pattern of the target key name term. Pattern searching for values can also be supported. If a target value specifies a pattern, data objects in the collection that have values that match the pattern of the target value can be found. Intersection processing can be implemented as described herein to find those data objects that have a key name-values pair matching the key name and value portions of the search query.

Example 16—Example Documents

In any of the examples herein, a document can take the form of a data object notation document that stores one or more data objects as described herein. For example, if a data object is one of a plurality of data objects in a data object collection representing JSON objects, the data object collection can represent a plurality of JSON documents comprising respective of the data objects.

Example 17—Example Semi-Structured Document Perspective

In any of the examples herein, the data object can be described from a semi-structured document perspective. A semi-structured document can take the form of one or more data objects represented by a lightweight data object notation persistence format comprising a plurality of attribute-value pairs and be represented in text form. The semi-structured nature of the document includes the characteristics that there is some structure (e.g., attributes have values), but full structure of a relational database is not imposed (e.g., types can vary, fields can be missing, and the like).

Example 18—Example Flexible Searching

In any of the examples herein, additional scenarios can be supported. For example, union of search results can be used instead of intersection (e.g., to support "or" queries or the like). Due to the references to the object-key name pairs, it can be easily determined on which fields hits were found, thereby providing an answer to the question "Why was the object a match?"

Example 19—Example Document Store Implementation

In any of the examples herein, searching a data object collection can be provided as a service by a document store. In such an implementation, data objects can be stored in units called "documents." Clients of the document store can add data objects to the collection of data objects in the document store, search the collection of data objects in the document store, query the document store, and the like without regard to the indexing of the data objects.

The document store can handle full ACID transactions, joins (e.g., collection to collection, collection to table, or the like), multitenant scenarios, and the like. A SQL-like syntax can be used. Scaling can be supported to the petabyte range, and the store can be implemented on commodity and server hardware.

From the perspective of clients, the document store can process documents in a standard format, such as JSON, but dictionaries and indexes can take advantage of the searching technologies described herein.

When documents are stored in collections, they are analogous to database tables in a relational database management system, even if the documents do not adhere to relational database principles. Similarly, documents can be analogous to rows or records. Thus, traditional operations such as queries, inserts, and the like can be used so that clients accessing the document store can take a familiar form.

The schema-less nature of the document store can make it very flexible. Fields can be added or removed to any document. Key names in one document need not be present in another (e.g., there are missing fields). The store can scale well horizontally, which is advantageous for big data processing. The store can still provide ACID properties.

Example 20—Example JSON Implementation in Web Environment

Figure 7:
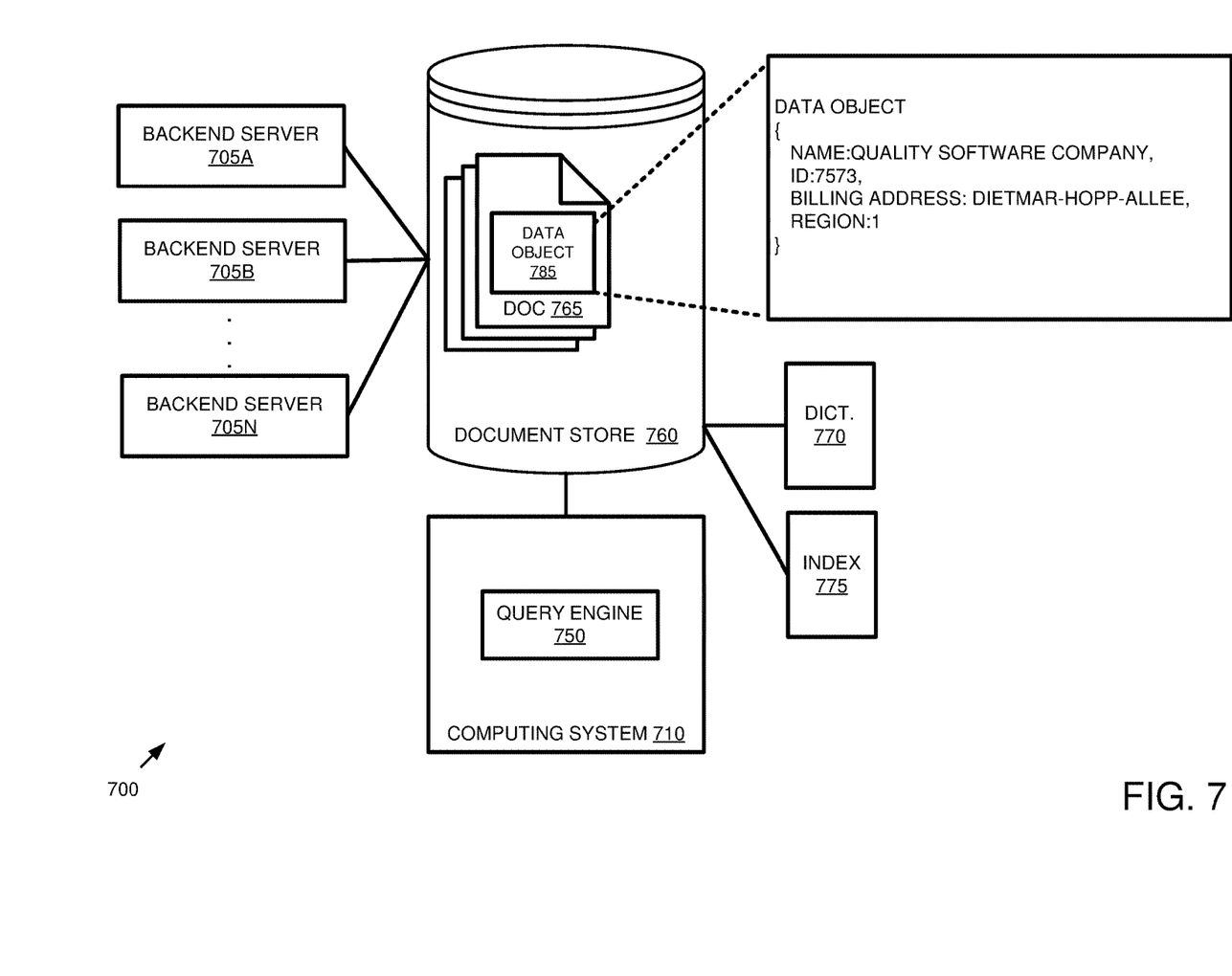
FIG. 7 is a block diagram of an example system implementing flexible text searching of JSON data objects in a web site environment.

FIG. 7 is a block diagram of an example system 700 implementing flexible text searching of JSON data objects in a web site environment.

In the example, a plurality of backend web servers 705A-N fulfill requests for web pages from a plurality of clients equipped with web servers (not shown). As part of processing, the backend servers 705A-N and the clients exchange semi-structured data in the form of JSON documents containing data objects 785. The data objects can be stored in a document store 760. As described herein, one or more dictionaries 770 and one or more indexes 775 can be used as part of the searching features. In practice, there can be multiple dictionaries and/or indexes used to assist searching of respective document collections.

Access to search functionality of the document store 760 can be provided by a query engine 750 and can integrate the search technologies described herein.

Example 21—Example Database Management System

In any of the examples herein, a database management system can take the form of a system that provides database management services. In practice, such a system is typically provided as a server providing services to a plurality of requesting clients.

Such a system can include an SQL engine that implements execution of SQL queries and other SQL operations. Queries as described herein can be implemented as SQL, extensions to SQL, or a separate system for performing searching of data objects.

Example 22—Example Computing Systems

Figure 8:
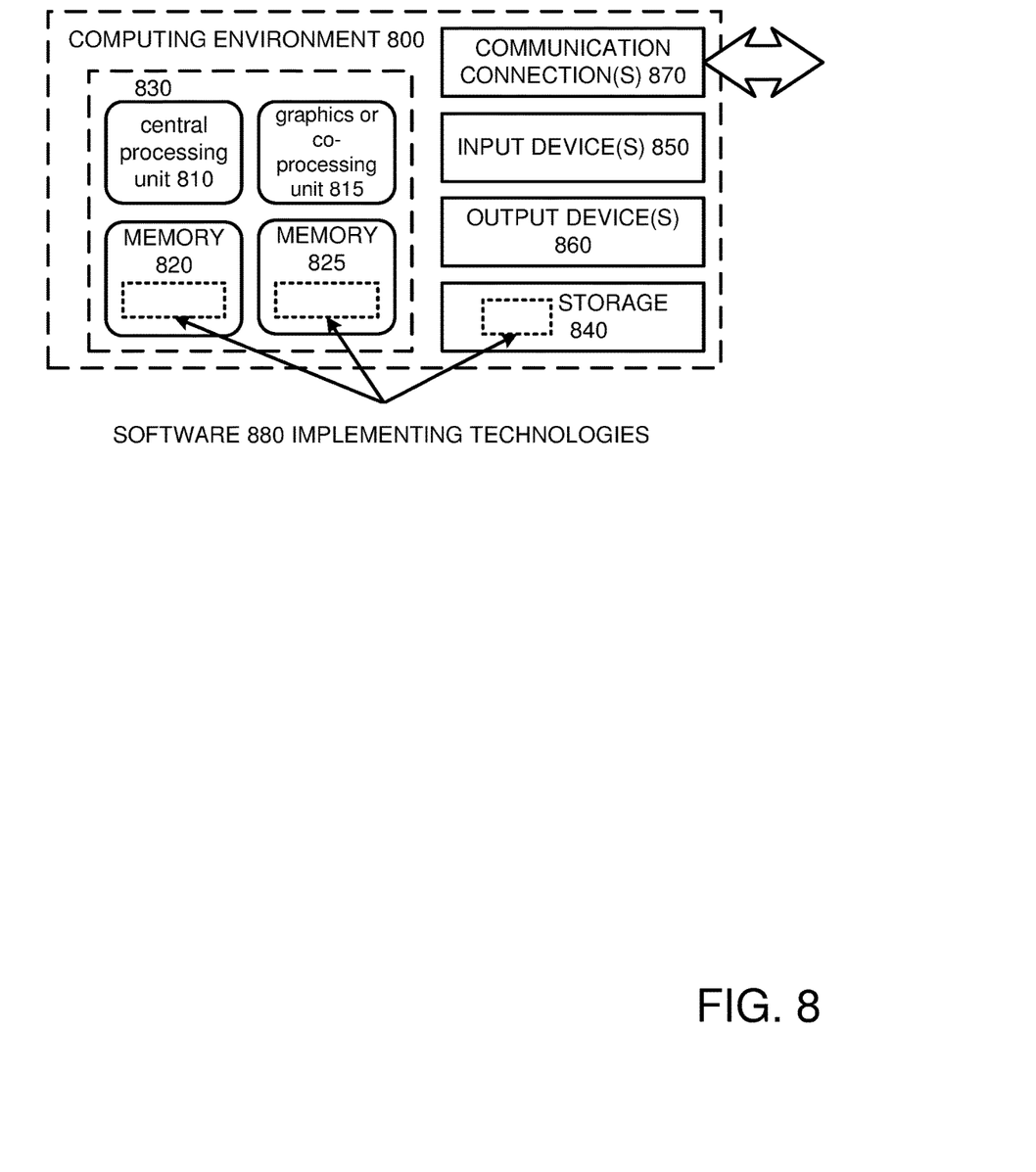
FIG. 8 is a diagram of an example computing system in which described embodiments can be implemented.

FIG. 8 illustrates a generalized example of a suitable computing system 800 in which several of the described innovations may be implemented. The computing system 800 is not intended to suggest any limitation as to scope of use or functionality, as the innovations may be implemented in diverse general-purpose or special-purpose computing systems.

With reference to FIG. 8, the computing system 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing system 800 includes storage 840, one or more input devices 850, one or more output devices 860, and one or more communication connections 870. An interconnection mechanism (not shown) such as a bus, controller, or network interconnects the components of the computing system 800. Typically, operating system software (not shown) provides an operating environment for other software executing in the computing system 800, and coordinates activities of the components of the computing system 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing system 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing system 800. For video encoding, the input device(s) 850 may be a camera, video card, TV tuner card, or similar device that accepts video input in analog or digital form, or a CD-ROM or CD-RW that reads video samples into the computing system 800. The output device(s) 860 may be a display, printer, speaker, CD-writer, or another device that provides output from the computing system 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 23—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. All that comes within the scope and spirit of the claims is therefore claimed.

What is claimed is:

1. A computer-implemented method comprising:
for a collection of data objects, wherein the collection of data objects comprises at least one data object that comprises one or more field name-value pairs, receiving a search query comprising a target field name term and a target value;
running the search query against the collection of data objects, wherein running the search query comprises finding data objects in the collection that have a field name-value pair with both a field name that inexactly matches the target field name term and a value that matches the target value; and
outputting results of the search query, wherein the results comprise an indication of the found data objects.

2. One or more computer-readable media comprising computer-executable instructions that when executed cause a computing system to perform the method of claim 1.

3. The method of claim 1 further comprising:
finding data objects in the collection that have a field name that inexactly matches the target field name term comprises finding data objects in the collection that have field names with terms that are a superset of the target field name term.

4. The method of claim 1 further wherein:
the target field name term specifies a pattern; and
finding data objects in the collection that have a field name that inexactly matches the target field name term comprises finding data objects in the collection that have field names that match the pattern of the target field name term.

5. The method of claim 1 further wherein:
the target value specifies a pattern; and
finding data objects in the collection comprises finding data objects in the collection that have values that match the pattern of the target value.

6. The method of claim 1 wherein finding data objects in the collection comprises:
finding data objects that are indicated as matching by both a field name term inverted index and a value term inverted index.

7. The method of claim 1 wherein:
finding data objects in the collection comprises finding an entry in a field name term inverted index that contains the target field name term; and
via the entry in the field name term inverted index, finding a matching data object.

8. The method of claim 1 wherein:
finding data objects in the collection comprises:
finding an entry in a field name term inverted index that contains the target field name term, wherein the entry comprises a plurality of references to a plurality of candidate data objects in the collection; and
determining an intersection between the candidate data objects and data objects that also have field name-value pair with a value that matches the target value.

9. The method of claim 8 wherein:
determining an intersection comprises:
finding an entry in a value term inverted index that matches the target value, wherein the entry comprises a plurality of references to other candidate objects in the collection; and
finding data objects that are referred to as matching by both the field name term inverted index and the value term inverted index.

10. A computing system comprising:
one or more processors;
memory;
in one or more computer-readable storage media, a field name term inverted index that associates field name terms and data objects in a data object collection in which the field name terms appear;

in one or more computer-readable storage media, a value term inverted index that associates value terms and data objects in the data object collection in which the value terms appear; and a query engine supporting search queries on the data objects, wherein the query engine inexactly matches a target field name term and a target value to data objects via the field name term inverted index and the value term inverted index.

11. The computing system of claim 10 further comprising:

a field name term dictionary associating field name terms with entries in the field name term inverted index.

12. The computing system of claim 10 wherein:

the query engine supports OR terms in a search query by performing a UNION on results found from the field name term inverted index.

13. The computing system of claim 10 wherein:

the query engine provides search results in the form of references to matching data objects.

14. The computing system of claim 10 wherein:

the query engine provides search results in the form of actual matching field name-value pairs, wherein at least one of the actual matching field name-value pairs has a field name with terms that are a superset of the target field name term.

15. The computing system of claim 10 wherein:

inexact matches comprise matches between the target field name term and a field name of a data object having a field name with extra field name terms beyond the target field name term.

16. The computing system of claim 10 wherein:

the data objects comprise a first data object with a field name not appearing as a field name in a second data object.

17. The computing system of claim 10 wherein:

the data objects represent a plurality of JSON documents comprising respective of the data objects.

18. The computing system of claim 10 wherein:

the search query is of a syntax that indicates that a specified string is to be interpreted as a field name term for inexact matching against field names of the data objects.

19. The computing system of claim 10 wherein:

inexactly matching comprises finding an entry in a field name term inverted index that contains the target field name term, wherein the entry comprises a plurality of references to a plurality of candidate data objects in the collection; and determining an intersection between the candidate data objects and data objects that also have a field name-value pair with a value that matches the target value.

20. One or more computer-readable media comprising computer-executable instructions that when executed cause a computing system to perform a method comprising:

receiving a search query comprising a target field name term and a target value;

finding an occurrence of the target field name term in a field name term dictionary, wherein the field name term dictionary associates the target field name term with an index reference into a field name term inverted index;

in an index entry of the field name term inverted index referenced by the index reference, determining a first set of candidate field name-object pairs, wherein at least one of the candidate field name-object pairs indicates at least one field name term other than the target field name term, whereby inexact matching is supported;

for the target value, determining a second set of candidate field name-object pairs;

determining an intersection of the first set of candidate field name-object pairs and the second set of candidate field name-object pairs, wherein the determining comprises comparing field name identifiers that are scalar values; and outputting the intersection of the first set of candidate field name-object pairs and the second set of candidate field name-object pairs as a result for the search query.

* * * * *